United States Patent
Sturm et al.

(10) Patent No.: US 12,050,125 B2
(45) Date of Patent: Jul. 30, 2024

(54) CONTROLLED BLOCKED FORCE EXCITER FOR SYSTEM IDENTIFICATION IN ASSEMBLED STRUCTURE

(71) Applicant: Robert Bosch Automotive Steering LLC, Plymouth, MI (US)

(72) Inventors: Michael Sturm, Milford, MI (US); Kevin Wienen, Farmington Hills, MI (US); Michael Yankonis, Whitmore Lake, MI (US); Andrew Thomas Moorhouse, Todmorden (GB)

(73) Assignee: Robert Bosch Automotive Steering LLC, Plymouth, MI (US)

( * ) Notice: Subject to any disclaimer, the term of this patent is extended or adjusted under 35 U.S.C. 154(b) by 377 days.

(21) Appl. No.: 17/396,412

(22) Filed: Aug. 6, 2021

(65) Prior Publication Data
US 2023/0041920 A1    Feb. 9, 2023

(51) Int. Cl.
*G01H 17/00*    (2006.01)
*G01M 13/028*    (2019.01)

(52) U.S. Cl.
CPC .......... *G01H 17/00* (2013.01); *G01M 13/028* (2013.01)

(58) Field of Classification Search
CPC .......... G01H 17/00; G01H 1/00; G01H 1/003; G01M 13/028; G01M 7/00; G01M 7/02;
(Continued)

(56) References Cited

U.S. PATENT DOCUMENTS 7,260,501 B2    8/2007    Pattipatti et al.
8,296,103 B2    10/2012   Son et al.
(Continued)

FOREIGN PATENT DOCUMENTS

EP    2113755 A1    11/2009

OTHER PUBLICATIONS

Elliott, et al., "Blocked forces for the characterisation of structure borne noise." INTER-NOISE and NOISE-CON Congress and Conference Proceedings. vol. 250. No. 1. Institute of Noise Control Engineering, 2015. (Year: 2015).*
(Continued)

*Primary Examiner* — Daniel R Miller
*Assistant Examiner* — Matthew W. Baca
(74) *Attorney, Agent, or Firm* — Michael Best & Friedrich LLP (57) ABSTRACT

Methods and systems for in-situ determination of system response functions. One example method includes coupling a controlled blocked force exciter to a calibration receiver structure. The method also includes operating the controlled blocked force exciter under controlled operation conditions to induce vibration in the calibration receiver structure and measuring response data for the calibration receiver structure. The method further includes determining blocked forces based on the response data for the calibration receiver structure. The method also includes coupling the controlled blocked force exciter to a target receiver structure. The method further includes operating the controlled blocked force exciter under the controlled operation conditions to induce vibration in the target receiver structure and measuring response data for the target receiver structure. The method also includes determining system response functions by relating the response data for the target receiver structure to the blocked forces.

16 Claims, 8 Drawing Sheets

(58) Field of Classification Search
CPC .... G01M 7/022; G01M 7/025; G01M 5/0066; G01M 5/00; G01M 7/027; G06F 17/10
See application file for complete search history.

(56) References Cited

U.S. PATENT DOCUMENTS

| | | | |
|---|---|---|---|
| 8,731,868 | B2 | 5/2014 | Janssens et al. |
| 9,704,307 | B2 | 7/2017 | Owen et al. |
| 9,824,511 | B2 | 11/2017 | Valeri et al. |
| 10,223,842 | B1 | 3/2019 | Lee et al. |
| 10,235,477 | B2 | 3/2019 | Caltagirone et al. |

OTHER PUBLICATIONS

Alber et al., "Independent characterization of structure-borne sound sources using the in-situ blocked force method", Proc. Internoise 2016, 2016, 12 pages.

Elliott et al., "In-situ source path contribution analysis of structure borne road noise," Journal of Sound and Vibration, vol. 332, 2013, pp. 6276-6295.

Lennstrom et al., "Validation of the blocked force method for various boundary conditions for automotive source characterization", Applied Acoustics, vol. 102, 2016, pp. 108-119.

Moorhouse et al., "In situ measurement of the blocked force of structure-borne sound sources," Journal of Sound and Vibration, vol. 325, 2009, pp. 679-685.

Sturm et al., "Robust NVH development of steering systems using in-situ blocked forces from measurements with low-noise driver simulators," Proc. Noise-Con, 2017, 8 pages.

Sturm et al., "The in-situ blocked force method for characterization of complex automotive structure-borne sound sources and its use for virtual acoustic prototyping," Proc. Int. Conf. On Noise & Vibr. Engineering (ISMA), 2016, pp. 3647-3662.

Van der Seijs et al., "A robust transfer path analysis method for steering gear vibrations on a test bench", Proc. Int. Conf. On Noise & Vibr. Engineering (ISMA), 2014, pp. 4027-4040.

Van der Seijs et al., "General Framework for Transfer Path Analysis: History, Theory and Classification of Techniques", Mechanical Systems and Signal Processing, vol. 68, 2016, pp. 217-244.

Wienen et al., "Robust NVH Engineering Using Experimental Methods—Source Characterization Techniques for Component Transfer Path Analysis and Virtual Acoustic Prototyping", SAE Technical Paper, 2019, 13 pages.

Zabel et al., "Internal transfer path analysis based on in-situ blocked forces and transmissibility functions", Porc. 24th International Congress on Sound and Vibration, 2017, 8 pages.

International Search Report for Application No. PCT/EP2022/071510 dated Nov. 29, 2022 (5 pages).

Wang et al., "A system response prediction approach based on global transmissibilities and its relation with transfer path analysis methods," Applied Acoustics, 2017, vol. 123, pp. 29-46.

Wienen, "Fast transfer path analysis using controlled electric motors as in-situ blocked force vibration sources," Thesis Abstract, University of Salford, 2021 (3 pages).

Wienen et al., "Generalised round-trip identity—For the determination of structural dynamic properties at locations inaccessible or too distant for direct measurement," Journal of Sound and Vibration, 2021, 511, 15 pages.

* cited by examiner

CONTROLLED BLOCKED FORCE EXCITER FOR SYSTEM IDENTIFICATION IN ASSEMBLED STRUCTURE

BACKGROUND

To achieve superior noise vibration and harshness ("NVH") quality in numerous products, ranging, for example, from vehicles, for example, passenger cars, to vacuum cleaners and various other products, various engineering techniques and tools are used to perform diagnosis and prediction of structure-borne noise in fully-assembled structures. Transfer path analysis ("TPA") is an example of one technique. One merit of TPA is that complex structures can be broken down into discrete source excitations (loads) and transfer paths. This breakdown facilitates rank ordering noise and vibration sources; studying the transmission of the induced vibrations to connected receivers; and other analyses. As a consequence, TPA is a widely-used NVH engineering tool, particularly in automotive industries.

TPA does have limitations though. Classic TPA is time consuming to apply due to the inherent labor-intensive inverse approach, requiring the source to be removed for system response function (SRF) measurements, such as a frequency response function ("FRF") and then refitted for operational measurements on the assembly. In addition, decoupling of the source and receiver can induce errors in the TPA model. Since classic TPA characterizes vibrating components by contact forces, data from vibrating components is only valid for exactly the source-receiver assembly in which it is acquired. With respect to developing components remotely from the vehicle, this information is of limited use.

In recent years, the in-situ blocked force method has emerged as a promising approach for independent characterization of structure-borne sound sources. Invoking matrix inversion to indirectly measure blocked forces at the source-receiver interface, the in-situ blocked force approach is similar to inverse force synthesis used in classic TPA. The major difference, however, is that all measurements are conducted in-situ. This eliminates the cumbersome decoupling stage which can cause inconsistency between operational and FRF measurement. The in-situ TPA ("iTPA") approach was found to be around 50 percent faster to apply than classic TPA with little to no impact on reliability. Due to the in-variant property of the blocked force, source data measured in-situ is transferable between different assemblies. This allows comparing sources operated under similar conditions, but in different assemblies (for example, bench and vehicle), or employing blocked forces from one installation (for example, bench) to predict vibration in or sound radiated from a different source-receiver combination (for example, a vehicle). The latter application is known as virtual acoustic prototyping ("VAP"). Recent research related to automotive VAP aims to predict and auralize noise induced by automotive mechatronic systems, such as electric power steering ("EPS") systems. Another field of research focuses on using in-situ blocked forces for transmissibility-based TPA methods.

One drawback of in-situ blocked force TPA approaches is that they involve time-consuming system identification and diagnosis steps, which make it difficult to use of TPA as a standard engineering tool on a daily basis. For example, performing iTPA to quantify the contribution of steering induced noise from an EPS to the overall cabin sound in a passenger vehicle can take up to a week, depending on the level of detail. Whilst collecting operational data by performing (manual) left/right steering only takes a couple of minutes, the required system identification step in complex automotive assemblies required in all mentioned TPA approaches cannot be performed in a time efficient way.

SUMMARY

The present disclosure provides controlled blocked force exciter systems and methods to facilitate multiple-input-multiple-output ("MIMO") system identification (i.e., an identification of all physically relevant transfer paths conducted at the same time) and diagnosis even in complex technical structures in an accurate and time efficient way. With reference to the examples described previously herein, using the disclosed systems and methods to diagnose steering induced EPS noise, the total time to perform iTPA in a passenger car can be reduced to only a couple of minutes by essentially turning the entire vibration source into a controllable multi-DOF ("degrees of freedom") blocked force shaker. In this manner, the invariance of the blocked force is exploited to unlock benefits as described below in more detail.

The present disclosure provides a method for in-situ determination of system response functions (which are described in more detail below). The method includes coupling a controlled blocked force exciter to a calibration receiver structure. The method also includes operating the controlled blocked force exciter under a set of controlled operation conditions to generate response data (for example, dynamic reaction forces (for example, blocked forces) and vibration responses (for example, displacement, acceleration, etc.) from the calibration receiver structure. In some implementations, the method further includes measuring response data for the calibration receiver structure while operating the controlled blocked force exciter under the set of controlled operation conditions. The method also includes determining a set of blocked forces based on the response data (for example, directly measured or measured indirectly using for example a matrix inverse procedure) for the calibration receiver structure. The method further includes coupling the controlled blocked force exciter to a target receiver structure. The method also includes operating the controlled blocked force exciter under the same set of controlled operation conditions to induce vibration in the target receiver structure. The method also includes measuring response data for the target receiver structure while operating the controlled blocked force exciter under the same set of controlled operation conditions. The method also includes determining a set of system response functions by relating the response data for the target receiver structure to the set of blocked forces used during the calibration measurement.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations, and explain various principles and advantages of those implementations.

The system and method components have been represented where appropriate by conventional symbols in the drawings, showing only those specific details that are pertinent to understanding the implementations so as not to obscure the disclosure with details that will be readily apparent to those of ordinary skill in the art having the benefit of the description herein.

DETAILED DESCRIPTION

A system response function ("SRF") is a mathematical description (for example, theoretical model derived from experiments) of a physical system's sensitivity to respond with at least one output signal (for example, vibration, sound pressure or other type of response) to at least one input signal (for example, dynamic load such as forces or moments) which are acting on the physical system at either collocated or non-collocated degrees of freedom ("DOFs"). A system response function may be expressed in the time domain, the frequency domain, the modal domain, the state space domain, or the physical domain. A system response function in the frequency domain may, for example, be a frequency response function ("FRF"), whereas in the time domain it may act as a filter (for example, a mathematical filter). The system response function may be measured between input points and response points. It may mathematically express the transfer of the (blocked) loads to the responses.

Measurement of system response functions may be conducted in-situ as described below in more detail. A system response function may be expressed as transmissibility, i.e., the mathematical relation of the system input signals and corresponding output signals both of which are represented by the same physical quantity. Examples of transmissibility-type system response functions are (blocked) force transmissibility, acceleration/velocity transmissibility, and transmissibility represented by a mathematical relation of equivalent frequency response functions (for example, acceleration/mobility/impedance ratio in which the underlying signals and/or frequency response function data is obtained). The nature of system response functions may comprise structural, acoustic, vibro-acoustic, or another description (for example, hydraulic [fluid] pressure, etc.) of an assembly's propagating properties. System response functions measured in the same assembly may or may not be of the same type. For example, different propagation/transfer paths can be expressed by different quantities at a system's various response degrees of freedom, in different domains, as ratios of the same (for example, FRF-type SRFs) or different (for example, transmissibility-type SRFs) input/output quantities, or a combination thereof.

Figure 1A:
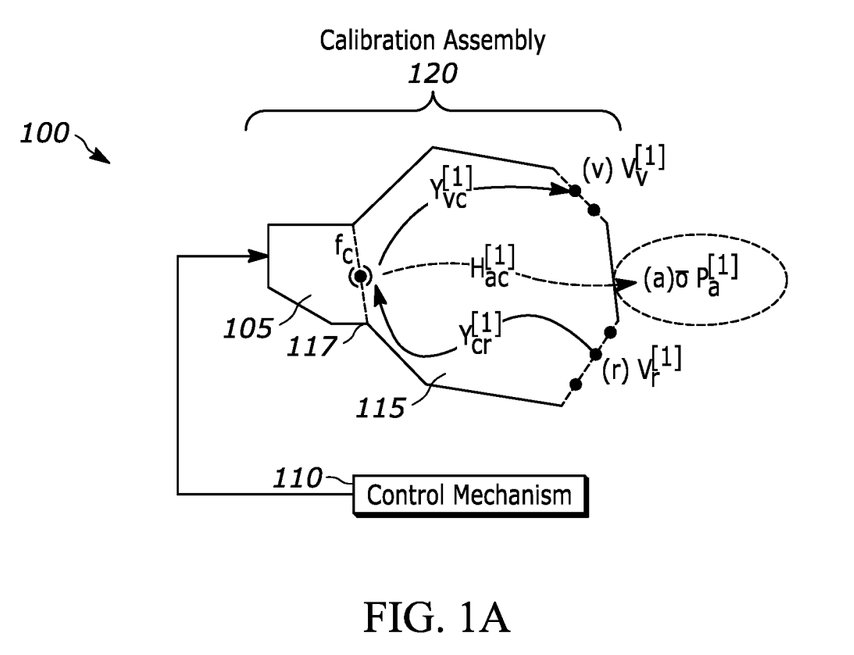
FIG. 1A is a block diagram of one example of a system, including a calibration assembly, for in-situ determination of system response functions, in accordance with some implementations.
Figure 1B:
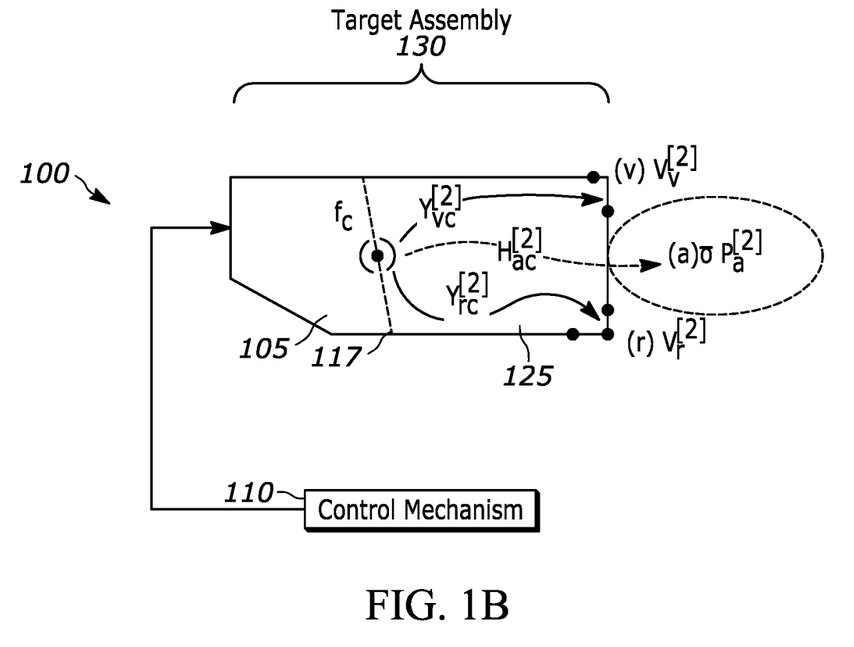
FIG. 1B is a block diagram of one example of a system, including a target assembly, for in-situ determination of system response functions, in accordance with some implementations.

FIGS. 1A and 1B are block diagrams of an example of a system 100 for in-situ determination of system response functions. The system 100 illustrated in FIGS. 1A and 1B includes a controlled blocked force exciter 105 and a control mechanism 110. The control mechanism 110 represents one or more devices which are configured to induce controlled forces and/or vibrations. The controlled blocked force exciter 105 illustrated in FIG. 1A is coupled to a calibration receiver structure 115 at a coupling interface 117A to form a calibration assembly 120. The controlled blocked force exciter 105 illustrated in FIG. 1B is coupled to a target receiver structure 125 at the coupling interface 117B to form a target assembly 130. In some implementations, the controlled blocked force exciter 105 is a separable component. As is described in more detail below, the controlled blocked force exciter 105 is a vibration source that is controllable through the control mechanism 110. In some implementations, the controlled blocked force exciter 105 includes one or more embedded vibration generating mechanisms. Examples of embedded vibration generating mechanisms include electric motors, component groups comprising electric motors (for example, electric motors connected to a mechanical gear) and other controllable devices generating reproducible vibrations (for example, pumps, controllable valves, injectors, compressors, combustion machinery, brake systems, etc.). Alternatively, or in addition, the controlled blocked force exciter 105 includes one or more external vibration generating mechanisms. External vibration generating mechanisms can include any type of apparatus installed on the structure of the controlled blocked force exciter 105 in order to create reproducible (equivalent) vibration fields at the coupling interface 117A. Such apparatuses do not alter the structural dynamic properties of the calibration assembly 120 or the target assembly 130, particularly at the coupling interface 117B. For at least this reason, most apparatuses embodied as external vibration generating mechanisms to provoke controlled vibrations generally are relatively light and small with respect to the physical system under test. Examples of instrumentation that would typically meet these requirements include small vibration exciters, so-called 'mini-shakers' (electro-dynamic or electro-magnetic principle) and impact hammers. In addition, any type of apparatus acting similarly/identical to the devices mentioned above as embedded vibration generating mechanism can serve the purpose of an external controlled vibration mechanism (in other words, an instance of the control mechanism 110) as long as it is controllable and attachable/applicable to the structure of the controlled blocked force exciter 105 but, by definition, is not part of the actual physical source. In order to sufficiently excite the physical structure, the controlled blocked force exciter 105 is excited at least at one, but usually at multiple different locations. In some implementations, this is achieved by applying excitations successively at different locations using the same excitation device whilst the device is moved to a new location after each excitation. In other implementations, this is achieved by instrumenting the structure with multiple vibration devices of the same or of different types at multiple fixed locations and operating these external devices successively or at the same time.

The controlled blocked force exciter 105 is a vibration source that is controllable through the control mechanism 110. Due to its operational state, the controlled blocked force exciter 105 induces vibration in the calibration receiver structure 115 and the target receiver structure 125. For example, in FIG. 1A, the controlled blocked force exciter 105 causes a vibration $Vv^{[1]}$ an interface (v), a vibration $V_r^{[1]}$ at an interface (r), and a structure-borne sound $p_a^{[1]}$ at an interface (a). As a further example, in FIG. 1B, the controlled blocked force exciter 105 causes a vibration $Vv^{[2]}$ at interface (v), a vibration $V_r^{[2]}$ at interface (r), and a structure-borne sound $p_a^{[2]}$ at interface (a). The source mechanisms of the controlled blocked force exciter 105 are unknown, requiring the controlled blocked force exciter 105 to be characterized at the coupling interface 117B by blocked forces ($f_c$). The relation between blocked forces, intrinsic to the controlled blocked force exciter 105, and the assembly responses (v) and (p) are expressed as structural (Y) and vibro-acoustic (H) assembly system response functions (SRF), respectively. It is to be understood that the term "blocked forces" is used herein interchangeably with the term "blocked loads." In addition, the term "blocked load" refers to a load exerted by a source (for example, a source of a force or forces) under physically or mathematically blocked or limited boundary conditions.

The calibration receiver structure 115 and the target receiver structure 125 are examples of passive receivers. There are no active vibration generating mechanisms within the calibration receiver structure 115 and the target receiver structure 125. In some implementations, the calibration receiver structure 115 and/or the target receiver structure 125 may include the other parts of an assembled machine (for example, apparatus) other than the controlled blocked force exciter 105, a test bench, or a foundation structure (for example, a building).

Figure 2:
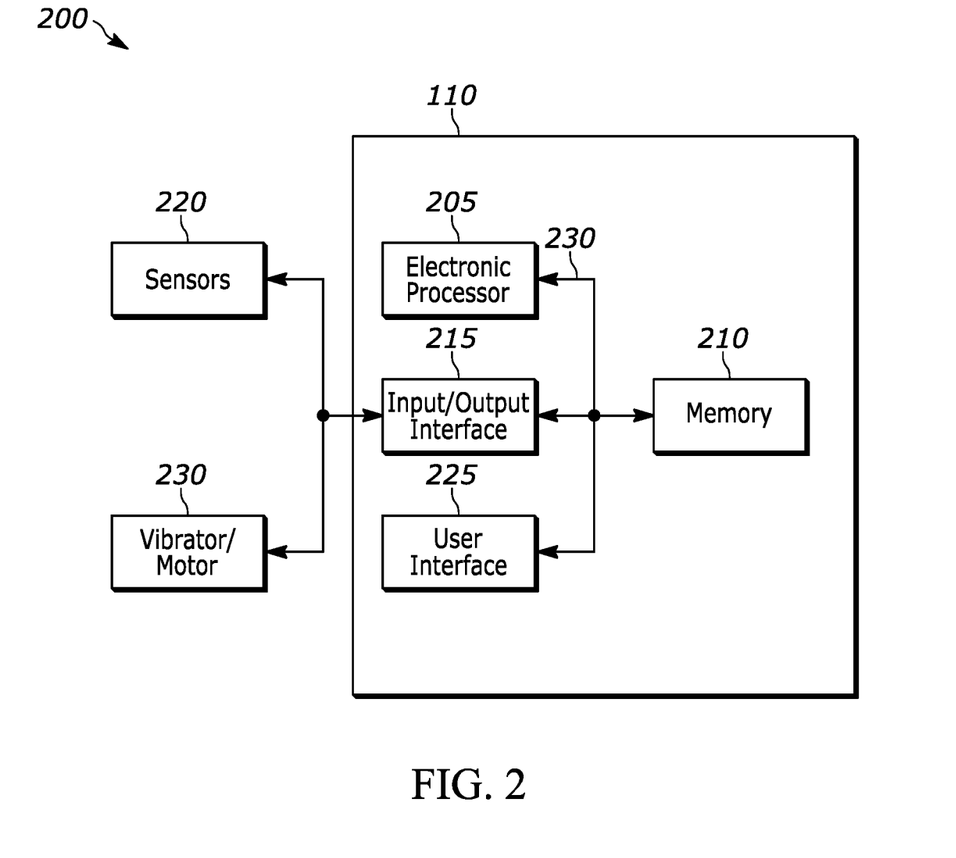
FIG. 2 is a block diagram of one example of control mechanism in the form of an electronic controller that generates blocked forces by controlling an electric motor and that may be used in the systems of FIGS. 1A and 1B, in accordance with some implementations.

FIG. 2 is block diagram of one example of the control mechanism 110. FIG. 2 illustrates a particular embodiment where the control mechanism 110 includes an electronic controller 200. The electronic controller 200 illustrated in FIG. 2 includes an electronic processor 205 (for example, one or more microprocessors, ASICs, SoCs, or other electronic controllers), a memory 210, and an input/output interface 215. Sensors 220 are, in some implementations, connected to the electronic controller 200. In some implementations, a vibrator or shaker/motor 230 is connected to the electronic controller 200. In some implementations, the electronic controller 200 includes a user interface 225, and a bus 230. The bus 230 connects various components of the electronic controller 200 including, for example, the memory 210 to the electronic processor 205. The memory 210 includes read only memory ("ROM"), random access memory ("RAM"), an electrically erasable programmable read-only memory ("EEPROM"), other non-transitory computer-readable media, or a combination thereof. The electronic processor 205, in some implementations, is configured to retrieve program instructions and data from the memory 210 and execute, among other things, instructions to perform the methods described herein. Alternatively, or in addition, the memory 210 is included in the electronic processor 205. The input/output interface 215 includes circuits and other mechanisms for transferring information between components within the electronic controller 200 and other components of the system 100, as well as components external to the system 100. The input/output interface 215 is configured to transmit and receive signals via wires, fiber, wirelessly, or a combination thereof. Signals may include, for example, control signals, information, data, serial data, data packets, analog signals, or a combination thereof. For example, the electronic controller 200 may send control signals via the input/output interface 215 to vibration generating mechanisms in the controlled blocked force exciter 105 which cause the vibration generating mechanisms to operate under a set of controlled operation conditions. The sensors 220 are configured to detect and measure, for example, responses, vibrations, acoustics, and the like for the calibration assembly 120 and the target assembly 130. For example, in some implementations, the sensors 220 include a set of load cells positioned between the controlled blocked force exciter 105 and the calibration receiver structure 115. Load cells may also be embedded between or as part of a post-processing system in order to monitor the "controlled excitation" at an interface different from coupling 117A/B. For this reason, sensors may be positioned on the source itself rather than at the coupling interface 117A/B.

In one example, the user interface 225 includes, for example, one or more input mechanisms (for example, a touch screen, a keypad, a button, a knob, and the like), one or more output mechanisms (for example, a display, a speaker, and the like), or a combination thereof. In some implementations, the user interface 225 includes a touch-sensitive interface (for example, a touch-screen display) that displays visual output generated by software applications executed by the electronic processor 205. Visual output includes, for example, graphical indicators, lights, colors, text, images, graphical user interfaces ("GUIs"), combinations of the foregoing, and the like.

It should be noted that in other cases controlled conditions may be implemented using control mechanisms other than the electronic controller 200. For example, an analog control system to control the voltage applied to a motor may be used. For example, a switch may be used to turn a power supply connected to a motor on and off. Other control mechanisms are described elsewhere herein.

The system 100 is configured to perform in-situ determination of system response functions (for example, structural and vibro-acoustic frequency response functions following a two-step procedure, consisting of a source characterization step and a system identification step. In the source characterization step, the system 100 characterizes the source strength of the controlled blocked force exciter 105 by means of blocked forces at the coupling interface 117A measured either on special test rigs (for example, perfectly rigid receiver to measure blocked forces directly or resiliently mounted to measure free velocity) or in arbitrary source-receiver installations (for example, using the in-situ blocked force or a hybrid method). In some embodiments, multiple sets of blocked forces are determined to account for all relevant operational states of the source. In the example provided, the system identification step exploits the invariance of blocked forces. The controlled blocked force exciter 105 is operated under the same controlled operation conditions as in the source characterization step while measuring the vibration and/or sound pressure response in the calibration assembly 120 or the target assembly 130. Since the blocked force output at the source-receiver interface of the controlled blocked force exciter 105 is known from the source characterization step, assembly system response functions can be calculated as the ratio of the assembly responses over the blocked force inputs. This allows the controlled blocked force exciter 105 to perform multiple-input-multiple-output ("MIMO") system identification in arbitrary assemblies. MIMO system identification is an important part of system diagnosis techniques, including those described above, for example, transfer path analysis ("TPA"), and predictive approaches such as virtual acoustic prototyping ("VAP").

Figure 3:
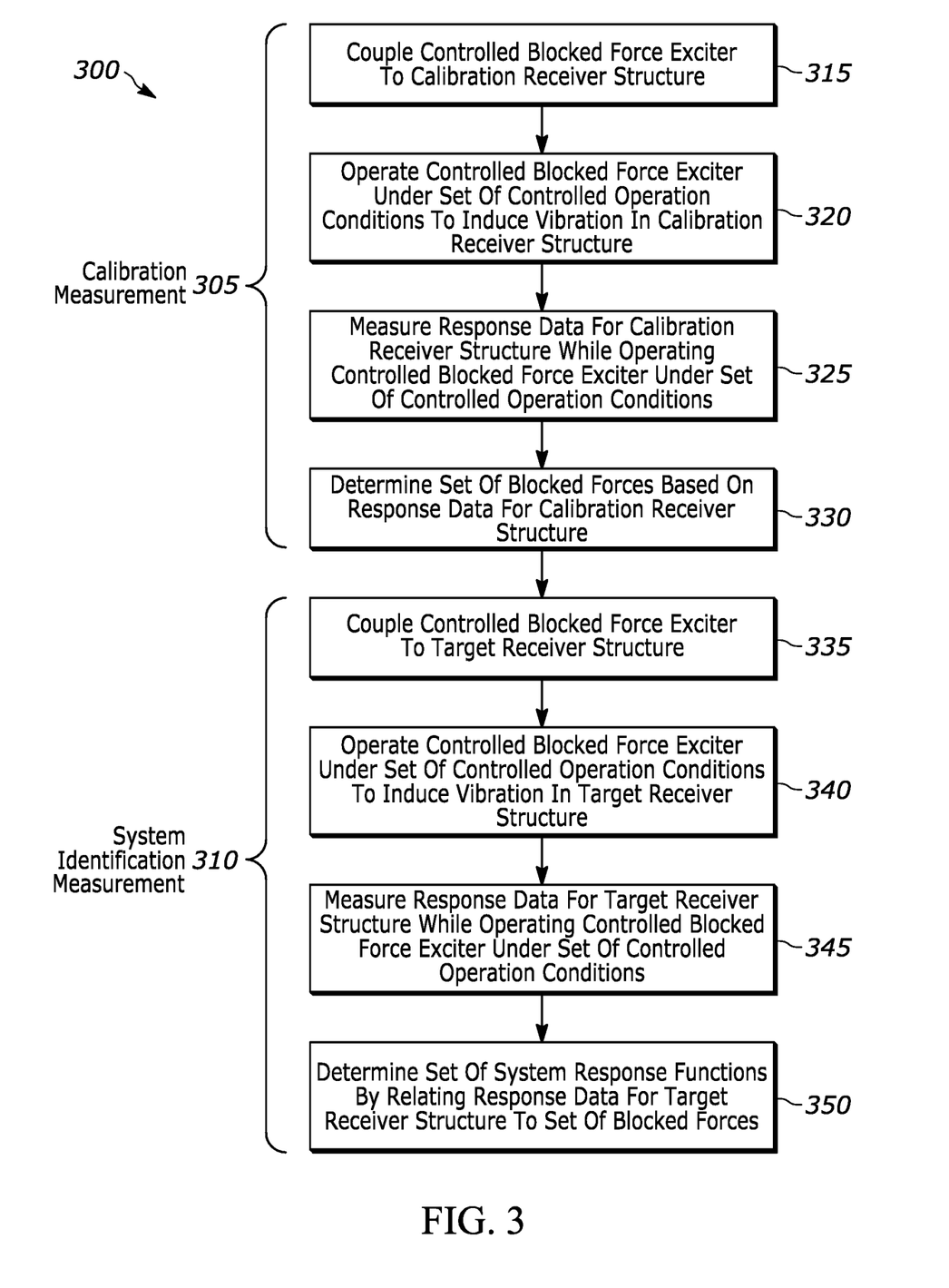
FIG. 3 is a flow diagram of a method for in-situ determination of system response functions, in accordance with some implementations.

FIG. 3 is a flow diagram of one example of a method 300 for in-situ determination of system response functions. The method 300 illustrated in FIG. 3 includes a calibration measurement portion 305 and a system identification measurement portion 310. A goal of the calibration measurement portion 305 is to characterize the source output strength (i.e., activity) of the controlled blocked force exciter 105 at all its coupling degrees of freedom (coupling-DOFs from coupling interface 117A) independently of the calibration assembly 120 or the test environment when the controlled blocked force exciter 105 is operated under controlled and sufficiently reproducible conditions. The calibration measurement portion 305 includes coupling the controlled blocked force exciter 105 to the calibration receiver structure 115 at block 315. At block 320, the controlled blocked force exciter 105 is operated under a set of controlled operation conditions to induce vibration in the calibration receiver structure 115. At block 325, response data for the calibration receiver structure 115 is measured while the controlled blocked force exciter 105 is operated under the set of controlled operation conditions. For example, in one implementation, one or more of the sensors 220 connected to the control mechanism 110 may measure response data for the calibration receiver structure 115. At block 330, a set of blocked forces is determined based on the response data for the calibration receiver structure 115. The determined set of blocked forces is sufficient to describe the output strength of the controlled blocked force exciter 105 at its defined contact degrees of freedom independently of the setup. As described below in more detail, the (receiver) independent characterization of the controlled blocked force exciter 105 is used in the system identification measurement portion 310 to perform system identification in arbitrary (target) assemblies.

The measurement at block 325 and the determination of blocked forces at block 330 can be achieved in different ways. In some implementations, the calibration receiver structure 115 is a rigid receiver and the blocked forces are measured directly by inserting a set of load cells into the flux of forces between the controlled blocked force exciter 105 and the calibration receiver structure 115, i.e., coupling interface 117A. Alternatively, or in addition, the controlled blocked force exciter 105 is resiliently mounted to the calibration receiver structure 115 and the free velocity is measured at coupling interface 117A (as per ISO 9611). A subsequent transformation step utilizing some type of system response function indicative for the structural dynamic properties at the controlled blocked force exciter 105 contact degrees of freedom (i.e., a set of predetermined system response functions). Alternatively, or in addition, the blocked forces are determined with a transposition of dynamic forces generated by operating the controlled blocked force exciter 105 with a specially designed calibration receiver structure (as per ISO/CD 21955). Alternatively, or in addition, the blocked forces are indirectly measured using an in-situ blocked force method (for example, as specified in ISO 20270:2019).

In the system identification measurement portion 310 of the method 300, the controlled blocked force exciter 105 is used as a calibrated (multi-DOF) vibration exciter inducing vibration equivalent to its intrinsic blocked loads into the target receiver structure 125 via all existing coupling DOFs. The system identification measurement portion 310 illustrated in FIG. 3 includes coupling the controlled blocked force exciter 105 to the target receiver structure 125 at block 335. In some implementations, the calibration receiver structure 115 and the target receiver structure 125 are the same structure. For example, the calibration receiver structure 115 and the target receiver structure 125 may be the same structure when employing the in-situ blocked force method described above. At block 340, the controlled blocked force exciter 105 is operating under the set of controlled operation conditions to induce vibration in the target receiver structure 125. Note that the set of controlled operation conditions used in block 340 is the same as or representative of the set of controlled operation conditions used in block 320. At block 345, response data for the target receiver structure 125 are measured while the controlled blocked force exciter 105 is operated under the set of controlled operation conditions. For example, one or more of the sensors 220 connected to the control mechanism 110 may measure response data for the target receiver structure 125. At block 350, a set of system response functions are determined by relating the response data for the target receiver structure 125 to the set of blocked forces. For example, system response function measurements employing shaker, system response functions are obtained from relating at least one system output signal (for example, vibration or acoustic response) to the driving input signal (for example, the dynamic force induced by utilize vibration exciter).

At least some of the systems and methods described herein determine system response functions in parallel for all existing coupling DOFs (input DOFs) and all existing output DOFs. Due to the (receiver) independent characterization (performed in the calibration measurement portion 305), the controlled blocked force exciter 105, when operated under the same or representative controllable and reproducible conditions, exerts the same (hypothetical) intrinsic blocked loads into the target receiver structure 125. This creates essentially the same (if the calibration receiver structure 115 and the target receiver structure 125 are identical) or an equivalent field of vibration (if the calibration receiver structure 115 and the target receiver structure 125 are different). For at least this reason, the input measurements required by conventional system response functions measurements are substituted by (mathematically) relating the output signals measured at the same controlled and sufficiently reproducible operational states in the target receiver structure 125 to the corresponding set of blocked forces obtained during the calibration measurement portion 305. In other words, conventional system identification methods require measuring applied dynamic input signals in the physical target assembly. As noted, at least some of the systems and methods described herein do not require measuring applied dynamic input signals.

The determined system response functions can be used for a variety of subsequent (or parallel) system diagnostics applications. For example, in some implementations, the system 100 is further configured to perform in-situ system diagnostics (for example, any TPA). System diagnostics is defined as methods for the characterization and/or analysis of vibrational and/or acoustic transfer path related data of a physical system or a model of a physical system where vibration or acoustics may play a role and in which data is involved that is directly or indirectly obtained utilizing the disclosed systems and methods. For system diagnostics, the controlled blocked force exciter 105 is operated while coupled to the target receiver structure 125 to generate vibration fields indicative of the intended use of the physical source. For example, the controlled blocked force exciter 105 is operated under a set of operation conditions to induce vibration in the target receiver structure 125. Response data (an example of "second response data") is measured for the target receiver structure 125 while operating the controlled blocked force exciter 105 under the set of operation conditions. In some instances, the post-processing system (for example, a computer running analysis software (for example, MATLAB software)) may then determine a set of operational forces based on the set of system response functions and the second response data for the target receiver structure 125. Alternatively, or in addition, the post-processing system may determine a transfer path analysis model based on the set of system response functions and the set of operational forces. Alternatively, or in addition, the post-processing system may determine structural, acoustic or other types system responses in the target assembly 130 using the set of system response functions (for example, on-board validation). Alternatively, or in addition, the post-processing system may model updating of numerical data, analytical data, and experimental data using the set of the system response functions (for example, to improve prediction/model accuracy, validate or design virtual twins, evaluate wear and tear events in repeated measurement studies over lifetime or any type of model-based condition monitoring. Alternatively, or in addition, the post-processing system 110 may perform any type of dynamic sub-structuring (coupling/decoupling) utilizing the set of system response functions (for example, to adjust or design structural dynamic properties in the same or a different physical system, mathematical system, or numerical systems by interchanging components using at least one mathematical method or numerical method). Alternatively, or in addition, the post-processing system may perform any other diagnostic task or predictive task involving data obtained from measurements in a different or the same assembly using the controlled blocked force exciter 105.

In some implementations, the set of system response functions between all coupling DOFs and an arbitrary number of (arbitrarily located) output DOFs can be measured in parallel in comparison to existing (traditional) system identification methods (for example, methods used for FRF and modal testing) in which roving instrumentation is used. The required repositioning of instrumentation may introduce errors related to: (i) connecting sensors/exciters to the target assembly (for example, local mass-loading, stiffening, damping etc.), (ii) inconsistent alignment of excitation and response DOFs, and (iii) errors introduced by the experimentalist (for example, confusing DOFs or directions) and/or insufficient skills with impact hammers/shakers.

In some implementations, the controlled blocked force exciter 105 remains coupled to the target receiver structure 125 as intended for its intended application without the need of additional instrumentation, particularly at the coupling interface 117B at which the controlled blocked force exciter 105 and the target receiver structure 125 are connected. The in-situ installation ensures that the system identification measurement portion 310 is conducted under (for a given application) ideal boundary conditions and with an entirely complete interface description. This means that, within the excited frequency range of interest, all actual present interface modes are considered implicitly in the identified system response functions, thus providing more accurate system models of the physical system.

In some implementations, when the identified system response functions are used for subsequent system diagnostics in the same installation, the system response functions and additionally required operational data are compatible and partial path contributions as calculated during TPA, for example, are predicted more precisely than with other existing methods.

In some implementations, the measurement time is reduced to a minimum during the system identification measurement portion 310. In one implementation, a single response measurement device (for example, a microphone or an accelerometer) placed at the desired target position (for example, the ear of a driver in a vehicle) is sufficient to derive a full vehicle model providing high level detail of the physical transfer paths.

In some implementations, different types of system response functions are measured (for example, structural, vibro-acoustic and/or other sensitivity functions) using the same (direct) excitation mechanism (i.e., the controlled blocked force exciter 105). Instrumentation costs, required skills, data consistency, overall labor and time can be reduced significantly, and reciprocal measurement are not required at all.

In some implementations, depending on the controlled blocked force exciter 105, the system identification measurement portion 310 and/or parts of a system diagnostics portion in the target assembly 130 may be partially or fully automized for which reason it is highly repeatable and can be used by untrained experimentalists.

In some implementations in which the in-situ blocked force method is used to conduct the calibration measurement portion 305, the calibration assembly 120 can be specifically designed so that accessibility to the coupling interface 117A is warranted or system in- and output DOFs can be chosen in a way convenient for instrumentation/measurement during the calibration measurement portion 305 and the system identification measurement portion 310.

In some implementations, the controlled blocked force exciter 105 once calibrated can be used multiple times in the same or multiple different target assemblies. In addition to considerable savings in terms of measurement time and effort, this implementation is significant with respect to warranting consistent measurement/excitation equipment; thus, reducing experimental errors due to non-calibrated or different equipment. Relative errors related to the use of different equipment and/or errors resulting from combining data obtained using different equipment and/or methods is reduced.

Figure 4A:
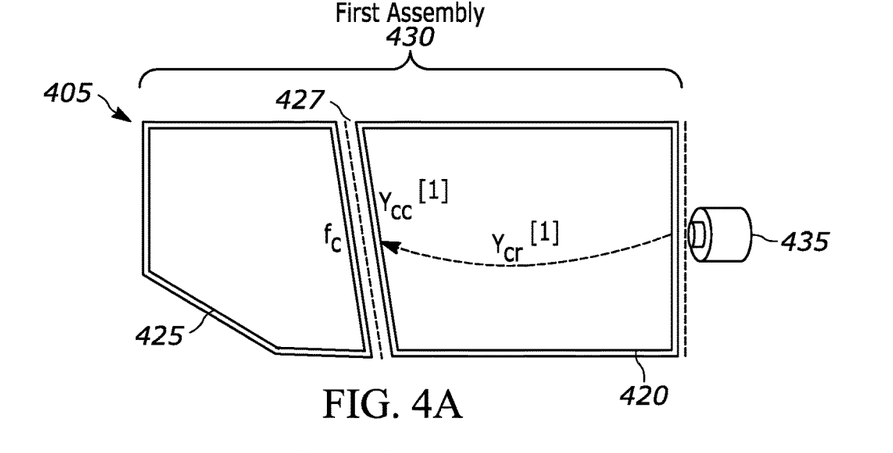
FIGS. 4A through 4C are blocks diagrams of steps of one example of a reciprocal method for in-situ determination of system response functions, in accordance with some implementations.
Figure 4B:
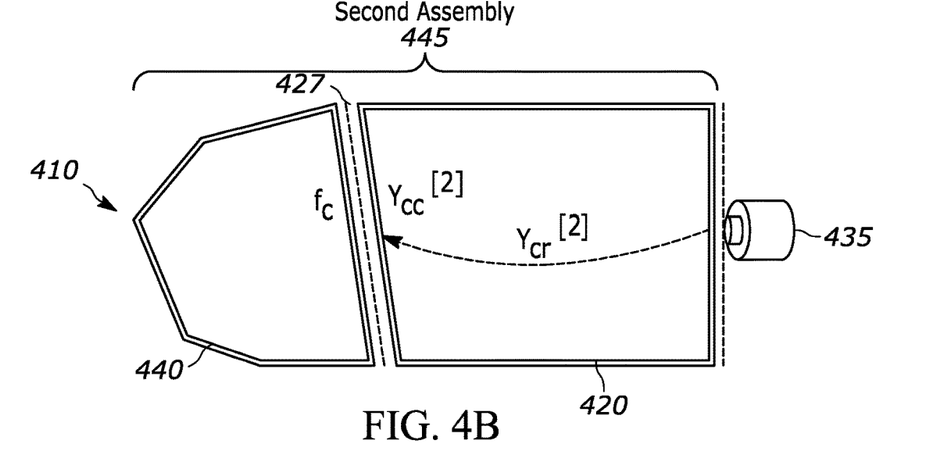
Figure 4C:
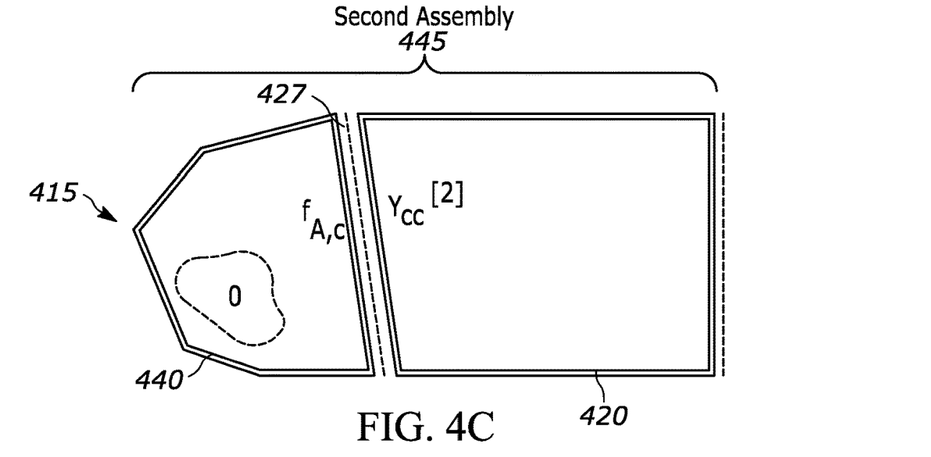

The approach disclosed above can also be applied reciprocally by simply reversing the substructures (source and receiver). As depicted in FIGS. 4A-4C, the reciprocal method includes three subsequent steps (steps 405, 410, and 415). In FIG. 4A, the receiver 420 is coupled to a first source 425 at a coupling interface 427 to form a first assembly 430. Step 405, illustrated in FIG. 4A, includes characterization of the receiver 420 (i.e., a passive substructure) as a blocked force exciter 436 including an external controllable vibration generating mechanism 435 for example, a shaker. For example, controlled receiver-side vibration mechanisms (for example, embedded mechanisms or externally applied sources for artificial excitation) are used for the receiver 420 to be characterized at the coupling interface 427 by blocked forces ($f_c$). To achieve sufficient blocked force data the receiver 420 (or the controlled blocked force exciter 435) is to be operated under controllable and reproducible conditions. Due to the passive characteristics of the receiver 420, the active operational state may be achieved through naturally occurring/embedded vibration sources or artificial excitation (such as excitation with an instrumented hammer or an electro-dynamic shaker) on the receiver-side. However, the excitation mechanisms may or may not be part of the physical assembly of the controlled blocked force exciter 435 but is needed to achieve multiple different operating states of the controlled blocked force exciter 435 without changing the dynamic structural properties of the receiver 420. In FIGS. 4B and 4C, the receiver 420 is coupled to a second source 440 at the coupling interface 427 to form a second assembly 445. In step 410, illustrated in FIG. 4B, the operational states of the controlled blocked force exciter 435 (as per step 405) are repeated to generate the same (or comparable) blocked forces between the calibrated receiver 420 and the second source 440. Both steps are used to determine sensitivity functions at the coupling interface 427 of the second assembly 445. The relation between blocked forces, intrinsic to the active receiver 420, and the assembly responses ($v_c$) at the coupling interface 427 are expressed as structural (Y) assembly sensitivity functions. In step 415, the previously identified sensitivity functions are utilized for the characterization of the actual source activity of substructure 440 with a simple response measurement at the coupling interface 427 using at least one mathematical method to combine these data.

Figure 5A:
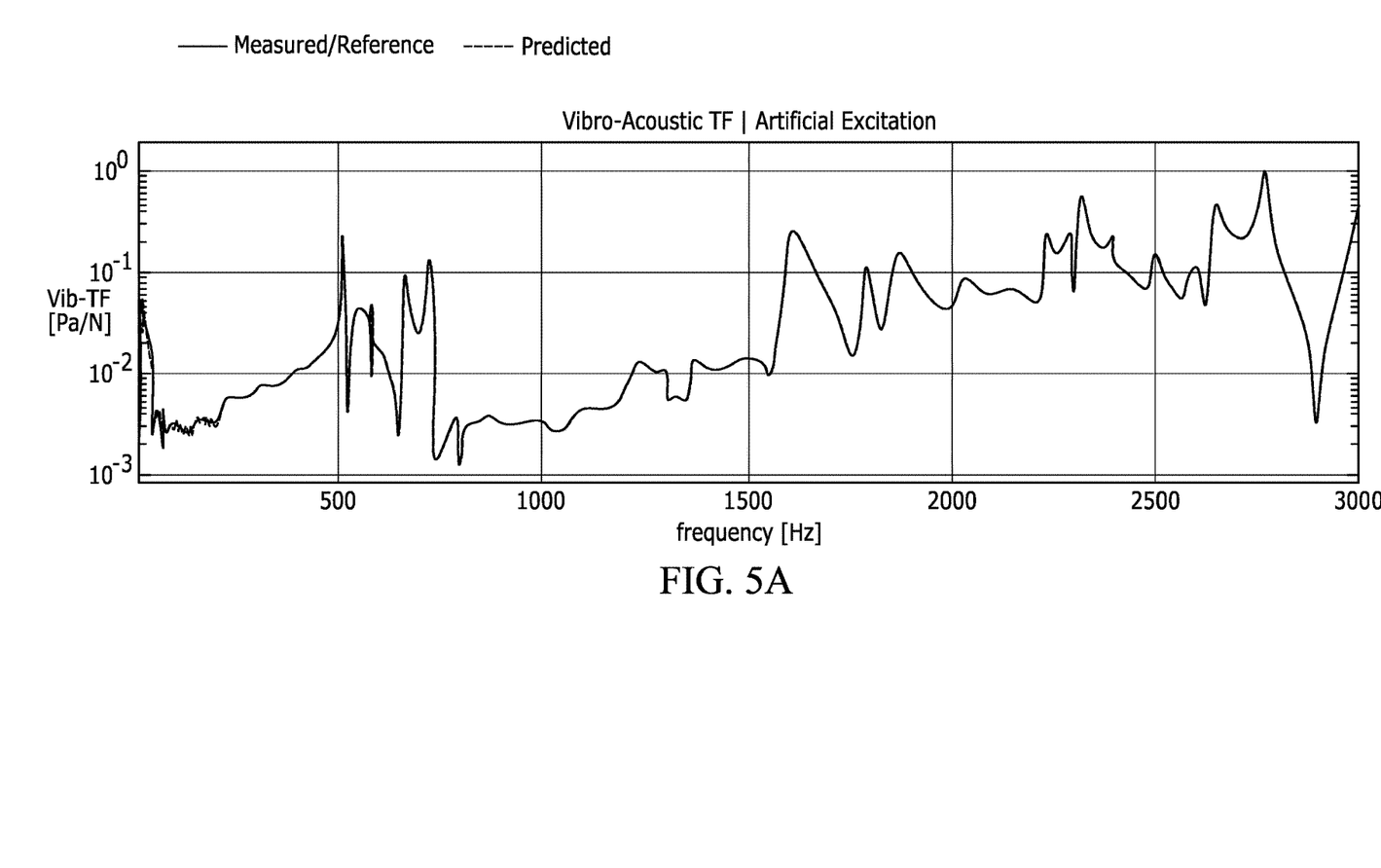
FIG. 5A is a graph of one example of predicted vs measured transfer functions using artificial excitation.
Figure 5B:
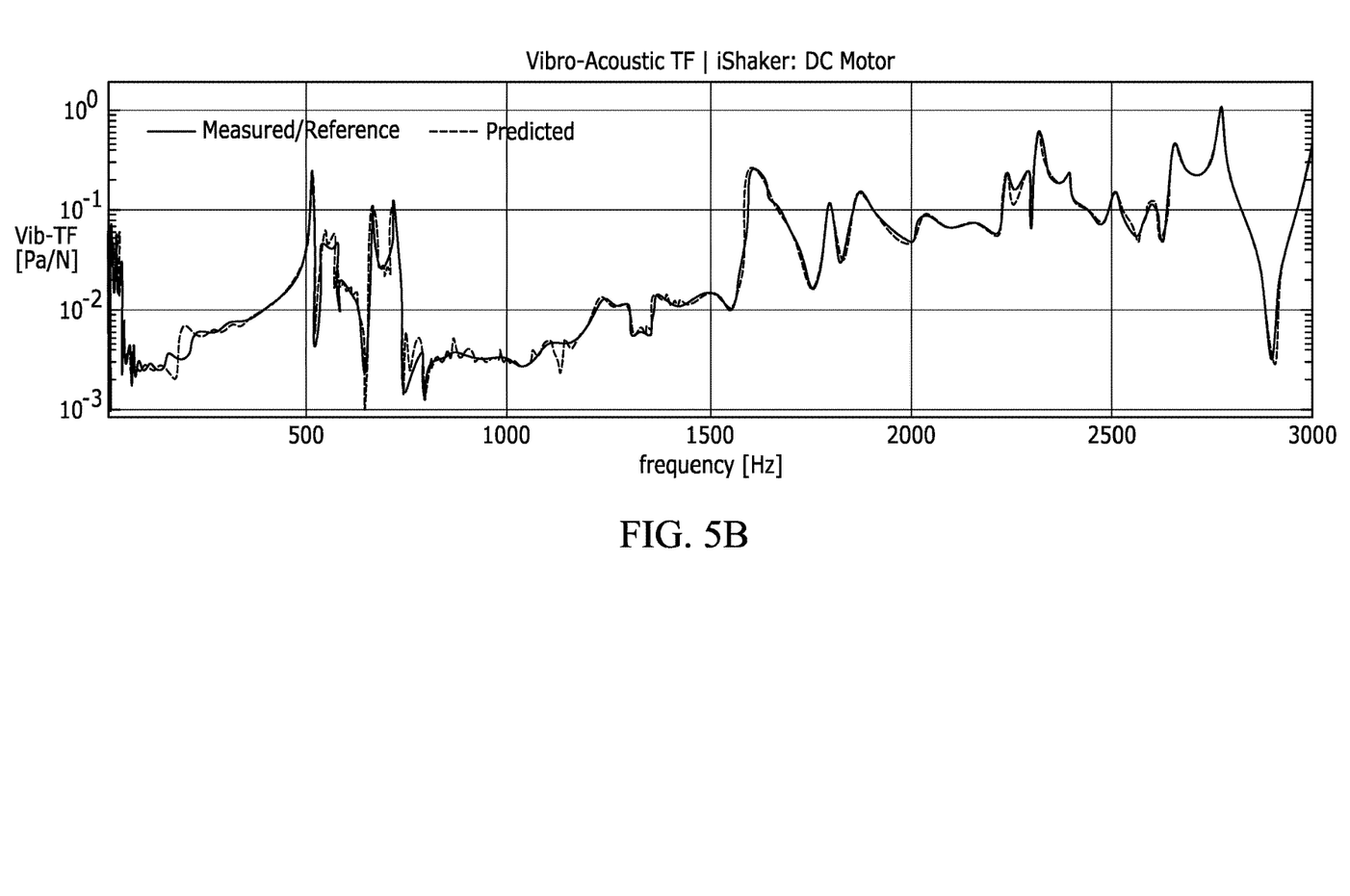
FIG. 5B is a graph of one example of predicted vs measured transfer functions using operational excitation.
Figure 5C:
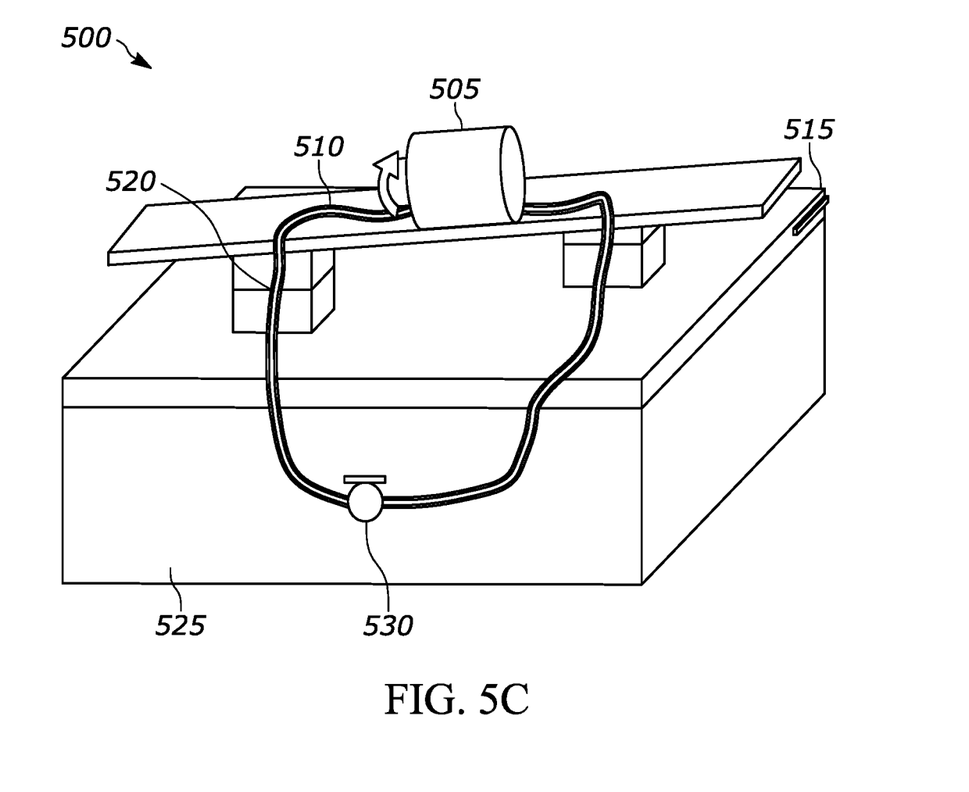
FIG. 5C is an illustration of a fully-assembled test structure.

FIG. 5A is a graph of one example of a predicted vs a measured transfer function using artificial excitation in a fully-assembled test structure. FIG. 5B is a graph of one example of a predicted vs a measured transfer function using operational excitation in a fully-assembled test structure. FIG. 5C illustrates an example of a fully-assembled test structure 500. The fully-assembled test structure 500 includes a motor 505 that is connected to a steel beam 510. The steel beam 510 is connected to an aluminum plate 515. Aluminum blocks provide a coupling interface 520. The aluminum plate 515 is connected to an aluminum box 525. The fully-assembled test structure 500 also includes a microphone 530.

With respect to the data illustrated in FIGS. 5A and 5B, the figures illustrate a frequency on the x axis and an amplitude of the predicted and measured transfer functions on the y axis. In some embodiments, the amplitude of the predicted and measured transfer functions (Pa/N) is represented by a sound pressure response (Pa), measured via the microphone 530, to a unit excitation (1 Newton). The data is gathered from a test structure, for example, the test structure 500 where a physical source structure is a steel beam, for example, the steel beam 510. The data in FIG. 5A was generated using external vibration generating and control mechanisms. The data in FIG. 5B was generated using embedded vibration generating control mechanisms. For the graph in FIG. 5A, artificial impact excitation is applied to random points on the source structure. For the graph in FIG. 5B, operational excitation is applied to the source via an electric DC motor, such as the motor 505. The vibrations generated by the external vibration generating and control mechanisms of FIG. 5A and/or the vibration generating control mechanisms of FIG. 5B are propagated through and radiated from the assembly. The radiated receiver-side sound pressure (i.e., the sound pressure response) is represented in FIG. 5A and FIG. 5B. The vibro-acoustic frequency response functions are measured using an impact hammer test as a reference. Predicted frequency response functions are determined using the controlled blocked force exciter methods described herein. In both FIGS. 5A and 5B, superior frequency response function quality is achieved within a multi-kilohertz range by using the source structure as the controlled blocked force exciter.

Figure 6:
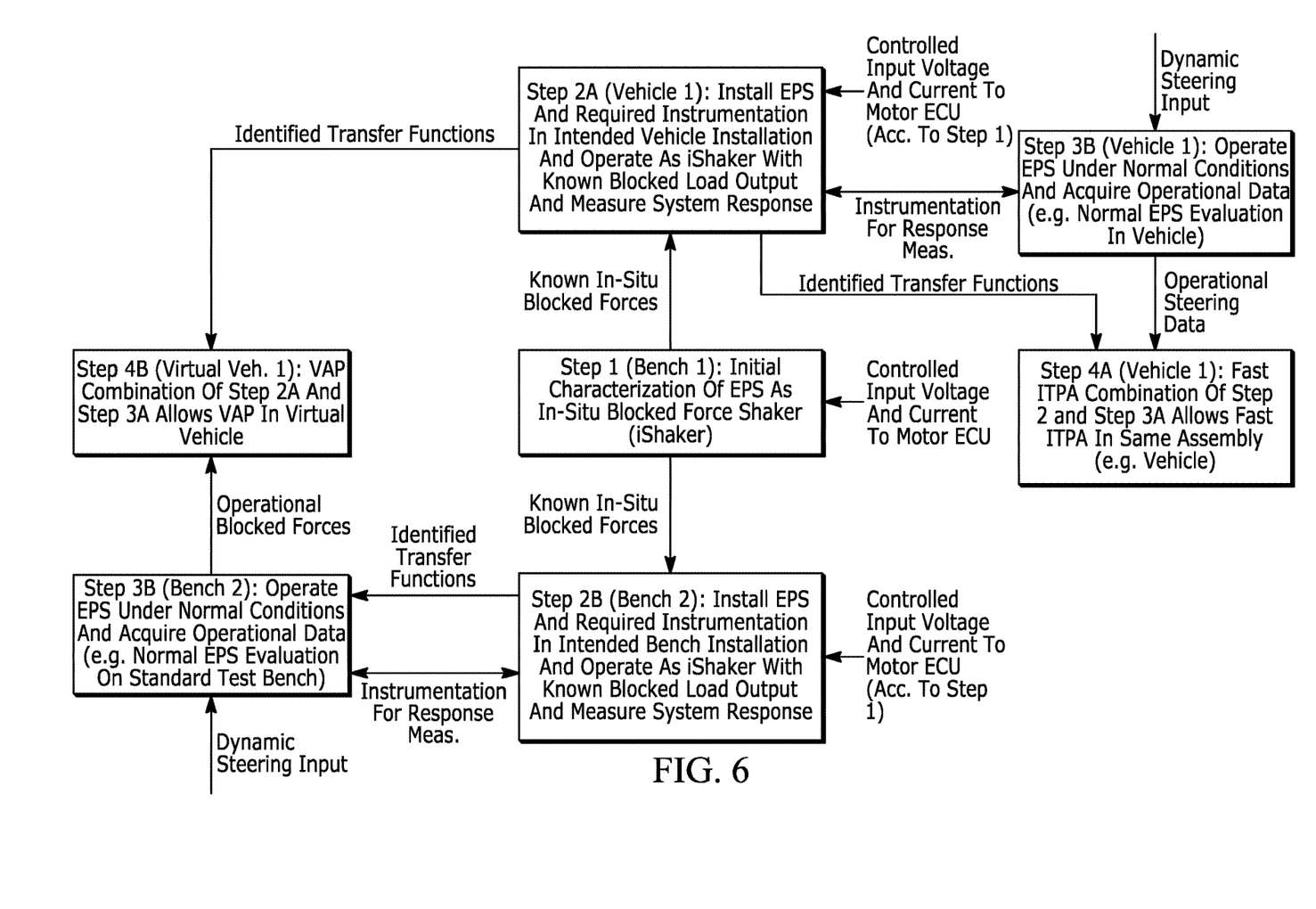
FIG. 6 is a flow diagram of one example of a method for conducting in-situ MIMO system identification in an electric power steering system, in accordance with some implementations.

The system and methods disclosure herein provide fast and reliable in-situ identification and/or diagnosis in complex multiple-input-multiple-output systems using blocked forces (or quantities that can be derived from or transferred into blocked forces) of controllable vibration sources. After an initial calibration measurement (determined, for example, using calibration measurement portion 305), any controllable vibration source can essentially be used as a controlled multi-DOF vibration exciter unlocking major commercial advantages. MIMO system identification is used in many industrial applications such as a wide range of Transfer Path Analysis techniques used for system diagnostics, independent source characterization on component-, sub-system- and system-level, as well as Virtual Acoustic Prototyping used to predict sound and vibration in the same or a different source-receiver installation. A potential application of the proposed controlled blocked force exciter approach is to assist with development of desirable noise, vibration, and harshness attributes in an electric power steering ("EPS") system. FIG. 6 illustrates a method for conducting in-situ MIMO system identification with the disclosed controlled blocked force exciter approach and related industrial applications to perform fast in-situ Transfer Path Analysis ("fast iTPA"), component-based source characterization and Virtual Acoustic Prototyping. Using the controlled blocked force exciter in the context of TPA is denoted as 'fast iTPA' due to the significant time advantage.

In the foregoing specification, specific implementations have been described. However, one of ordinary skill in the art appreciates that various modifications and changes may be made without departing from the scope of the claims set forth below. Accordingly, the specification and figures are to be regarded in an illustrative rather than a restrictive sense, and all such modifications are intended to be included within the scope of the disclosure.

Unless the context indicates otherwise, the benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Unless the context indicates otherwise, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The term "coupled" as used herein is defined as connected, although not necessarily directly and not necessarily mechanically. A device or structure that is "configured" in a certain way is configured in at least that way but may also be configured in ways that are not listed.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method for determination of system response functions, the method comprising:
coupling a controlled blocked force exciter to a calibration receiver structure;
operating the controlled blocked force exciter under a set of controlled operation conditions to induce vibration in the calibration receiver structure;
measuring response data for the calibration receiver structure while operating the controlled blocked force exciter under the set of controlled operation conditions;
determining a set of blocked forces based on the response data for the calibration receiver structure;
coupling the controlled blocked force exciter to a target receiver structure, wherein the calibration receiver structure and the target receiver structure have different structures;
operating the controlled blocked force exciter under the set of controlled operation conditions to induce vibration in the target receiver structure;
measuring response data for the target receiver structure while operating the controlled blocked force exciter under the set of controlled operation conditions; and
determining a plurality of system response functions by relating the response data for the target receiver structure to the set of blocked forces determined for the calibration receiver structure.

2. The method of claim 1, further comprising:
operating the controlled blocked force exciter under a set of operation conditions to induce vibration in the target receiver structure;
measuring second response data for the target receiver structure while operating the controlled blocked force exciter under the set of operation conditions; and
determining a set of operational forces based on the set of system response functions and the second response data for the target receiver structure.

3. The method of claim 2, further comprising:
determining a transfer path analysis model based on the set of system response functions and the set of operational blocked forces.

4. The method of claim 1, wherein the response data for the calibration receiver structure includes in-situ path input data for at least one point of the calibration receiver structure, and wherein determining the set of blocked forces based on the response data for the calibration receiver structure includes identifying at least one parametric load model characterizing structural and acoustic loads acting on the calibration receiver structure as a function of the in-situ path input data through the at least one point of the calibration receiver structure while operating the controlled blocked force exciter under the set of controlled operation conditions.

5. The method of claim 1, wherein the calibration receiver structure is a rigid receiver, wherein measuring the response data for the calibration receiver structure while operating the controlled blocked force exciter under the set of controlled operation conditions includes measuring the set of blocked forces using a set of load cells positioned between the controlled blocked force exciter and the calibration receiver structure at a coupling interface.

6. The method of claim 1, wherein the controlled blocked force exciter is resiliently mounted to the calibration receiver structure, wherein the response data for the calibration receiver structure includes one or more free velocity measurements, and wherein determining the set of blocked forces based on the response data for the calibration receiver structure includes determining the set of blocked forces based on the one or more free velocity measurements and a predetermined system response function at a coupling interface.

7. The method of claim 1, wherein operating the controlled blocked force exciter under the set of controlled operation conditions to induce the vibration in the calibration receiver structure includes operating one or more embedded vibration generating mechanisms included in the controlled blocked force exciter under the set of controlled operation conditions to induce the vibration in the calibration receiver structure, and
wherein operating the controlled blocked force exciter under the set of controlled operation conditions to induce the vibration in the target receiver structure includes operating the one or more embedded vibration generating mechanisms under the set of controlled operation conditions to induce the vibration in the target receiver structure.

8. The method of claim 1, further comprising applying one or more external vibration generating mechanisms on the controlled blocked force exciter, wherein operating the controlled blocked force exciter under the set of controlled operation conditions to induce the vibration in the calibration receiver structure includes operating the one or more external vibration generating mechanisms under the set of controlled operation conditions to induce the vibration in the calibration receiver structure, and
wherein operating the controlled blocked force exciter under the set of controlled operation conditions to induce the vibration in the target receiver structure includes operating the one or more external vibration generating mechanisms under the set of controlled operation conditions to induce the vibration in the target receiver structure.

9. A system for determining system response functions, the system comprising:
a controlled blocked force exciter;
calibration receiver structure; and
a target receiver structure; wherein the system is configured to
operate the controlled blocked force exciter under a set of controlled operation conditions to induce vibration in the calibration receiver structure;
measure response data for the calibration receiver structure while operating the controlled blocked force exciter under the set of controlled operation conditions;
determine a set of blocked forces based on the response data for the calibration receiver structure;
operate the controlled blocked force exciter under the set of controlled operation conditions to induce vibration in the target receiver structure;

measure response data for the target receiver structure while operating the controlled blocked force exciter under the set of controlled operation conditions; and determine a plurality of system response functions by relating the response data for the target receiver structure to the set of blocked forces determined for the calibration receiver structure, wherein the calibration receiver structure and the target receiver structure have different structures.

10. The system of claim 9, wherein the system is configured to:

operate the controlled blocked force exciter under a set of operation conditions to induce vibration in the target receiver structure;

measure second response data for the target receiver structure while operating the controlled blocked force exciter under the set of operation conditions; and determine a set of operational forces based on the set of system response functions and the second response data for the target receiver structure.

11. The system of claim 10, wherein the system is configured to determine a transfer path analysis model based on the set of system response functions and the set of operational blocked forces.

12. The system of claim 10, wherein the response data for the calibration receiver structure includes in-situ path input data for at least one point of the calibration receiver structure, and wherein determining the set of blocked forces based on the response data for the calibration receiver structure including identifying at least one parametric load model characterizing structural and acoustic loads acting on the calibration receiver structure as a function of the in-situ path input data through the at least one point of the calibration receiver structure while operating the controlled blocked force exciter under the set of controlled operation conditions.

13. The system of claim 9, wherein the calibration receiver structure is a rigid receiver, wherein measuring the response data for the calibration receiver structure while operating the controlled blocked force exciter under the set of controlled operation conditions includes measuring the set of blocked forces using a set of load cells positioned between the controlled blocked force exciter and the calibration receiver structure at a coupling interface.

14. The system of claim 9, wherein the controlled blocked force exciter is resiliently mounted to the calibration receiver structure, wherein the response data for the calibration receiver structure includes one or more free velocity measurements, and wherein determining the set of blocked forces based on the response data for the calibration receiver structure includes determining the set of blocked forces based on the one or more free velocity measurements and a predetermined system response function at a coupling interface.

15. The system of 9, wherein the controlled blocked force exciter includes one or more embedded vibration generating mechanisms, and wherein operating the controlled blocked force exciter includes operating the one or more embedded vibration generating mechanisms under the set of controlled operation conditions to induce the vibration in the calibration receiver structure, and wherein operating the controlled blocked force exciter includes operating the one or more embedded vibration generating mechanisms under the set of controlled operation conditions to induce the vibration in the target receiver structure.

16. The system of 9, further comprising applying one or more external vibration generating mechanisms on the controlled blocked force exciter, wherein operating the controlled blocked force exciter under the set of controlled operation conditions to induce the vibration in the calibration receiver structure includes operating the one or more external vibration generating mechanisms under the set of controlled operation conditions to induce the vibration in the calibration receiver structure, and wherein operating the controlled blocked force exciter under the set of controlled operation conditions to induce the vibration in the target receiver structure includes operating the one or more external vibration generating mechanisms under the set of controlled operation conditions to induce the vibration in the target receiver structure.

* * * * *